(12) United States Patent
Fuke

(10) Patent No.: US 10,999,718 B2
(45) Date of Patent: May 4, 2021

(54) VEHICLE FUNCTION CONTROL DEVICE AND VEHICLE FUNCTION CONTROL SYSTEM

(71) Applicant: TOYOTA JIDOSHA KABUSHIKI KAISHA, Toyota (JP)

(72) Inventor: Jumpei Fuke, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 163 days.

(21) Appl. No.: 16/027,719

(22) Filed: Jul. 5, 2018

(65) Prior Publication Data

US 2019/0053021 A1 Feb. 14, 2019

(30) Foreign Application Priority Data

Aug. 9, 2017 (JP) .............................. JP2017-154578

(51) Int. Cl.
*H04W 4/40* (2018.01)
*H04W 4/48* (2018.01)
(Continued)

(52) U.S. Cl.
CPC ............ *H04W 4/40* (2018.02); *B60R 25/245* (2013.01); *B60W 50/0098* (2013.01); *B60W 50/085* (2013.01); *E05B 81/00* (2013.01); *E05B 83/36* (2013.01); *E05F 15/76* (2015.01); *H04W 4/48* (2018.02); *B60R 16/023* (2013.01); *B60W 2540/043* (2020.02); *E05Y 2201/22* (2013.01); *E05Y 2400/44* (2013.01); *E05Y 2400/85* (2013.01); *E05Y 2400/852* (2013.01);
(Continued)

(58) Field of Classification Search
CPC ....... H04W 4/00–029; H04W 4/30–80; H04W 76/00–16; H04W 88/00–028; H04W 92/00–04; H04W 92/16–18; B60W 50/0098; B60W 50/085; B60W 2540/043
See application file for complete search history.

(56) References Cited

U.S. PATENT DOCUMENTS

2013/0143594 A1 6/2013 Ghabra et al.
2014/0043139 A1* 2/2014 Humphrey ............ B60R 25/245
340/5.72
(Continued)

FOREIGN PATENT DOCUMENTS

CN 103217662 A 7/2013
CN 103581908 A 2/2014
(Continued)

*Primary Examiner* — San Htun
(74) *Attorney, Agent, or Firm* — Oliff PLC

(57) ABSTRACT

A vehicle function control device that controls functions of a vehicle includes an electronic control unit configured to determine whether there is a terminal device performing communication with an in-vehicle communication device around the in-vehicle communication device using the in-vehicle communication device, when determination is made that there is the terminal device performing communication with the in-vehicle communication device around the in-vehicle communication device, determine whether a distance between the in-vehicle communication device and the terminal device is within a predetermined range, and control execution of a specific function of the vehicle based on a determination result.

11 Claims, 5 Drawing Sheets

(51) Int. Cl.
*H04W 4/80* (2018.01)
*B60W 50/00* (2006.01)
*B60W 50/08* (2020.01)
*E05F 15/76* (2015.01)
*E05B 81/00* (2014.01)
*E05B 83/36* (2014.01)
*B60R 25/24* (2013.01)
*B60R 16/023* (2006.01)
*H04W 4/021* (2018.01)

(52) U.S. Cl.
CPC ..... *E05Y 2900/531* (2013.01); *E05Y 2900/55* (2013.01); *H04W 4/021* (2013.01); *H04W 4/80* (2018.02)

(56) References Cited

U.S. PATENT DOCUMENTS

| | | | |
|---|---|---|---|
| 2014/0172192 A1* | 6/2014 | Kato | H04M 1/72533 701/2 |
| 2014/0285319 A1* | 9/2014 | Khan | B60R 25/00 340/5.61 |
| 2015/0332530 A1* | 11/2015 | Kishita | |
| 2016/0182548 A1* | 6/2016 | Ghabra | H04W 24/00 726/23 |

FOREIGN PATENT DOCUMENTS

| | | |
|---|---|---|
| JP | 2002-315050 A | 10/2002 |
| JP | 2005-247094 A | 9/2005 |
| JP | 2012-082653 A | 4/2012 |
| JP | 2013-231327 A | 11/2013 |
| JP | 2017-110373 A | 6/2017 |

\* cited by examiner

VEHICLE FUNCTION CONTROL DEVICE AND VEHICLE FUNCTION CONTROL SYSTEM

INCORPORATION BY REFERENCE

The disclosure of Japanese Patent Application No. 2017-154578 filed on Aug. 9, 2017 including the specification, drawings and abstract is incorporated herein by reference in its entirety.

BACKGROUND

1. Technical Field

The present disclosure relates to a vehicle function control device and a vehicle function control system that control execution of functions of a vehicle.

2. Description of Related Art

Japanese Unexamined Patent Application Publication No. 2012-82653 (JP 2012-82653 A) describes an electronic key system in which an electronic key and an in-vehicle device communicate with each other using an electric wave in a low frequency (LF) band and an electric wave in an ultra high frequency (UHF) band, and authentication (smart authentication) of the electronic key is performed. In the electronic key system described in JP 2012-82653 A, execution of a smart authentication function is suppressed for a predetermined period after a door is locked, and unlocking or locking of the door is enabled solely through an operation of a switch in the electronic key.

SUMMARY

A vehicle is provided with various functions, such as the smart authentication function described above. A user can switch whether to validate or invalidate a part of functions.

For example, since some users of a cardiac pacemaker desire to turn off the smart authentication function described above when the user gets on a vehicle, the on and off of the smart authentication function can be switched by customization. However, in a case where a user and a nonuser of the cardiac pacemaker use the same vehicle in common, when the smart authentication function is turned off by customization, convenience is degraded for the nonuser of the cardiac pacemaker.

In a case where a pet or a child is in a vehicle, switches on a driver's seat may be operated abruptly, and in this case, setting may be changed or safety of traveling may be damaged. However, even in this case, when a need or convenience at the time of driving is taken into consideration, invalidating operations of switches uniformly is not realistic.

The rear doors of the vehicle are provided with a child safety lock capable of suppressing door opening from the inside of the vehicle. The on and off of the child safety lock can be switched through an operation of a lever provided in the door. While the above-described child safety lock function is convenient from a standpoint of reducing abrupt door opening by the pet or the child, in a case where an adult sits on a seat beside a door with child safety lock, the adult feels inconvenience since the adult cannot open the door by himself/herself. Performing a lever operation to switch the on and off of the child safety lock function on the occasion of getting on and off is complicated.

As described above, while the functions of the vehicle are validated (or restricted) for a part of users, in a case where the functions are validated (restricted) uniformly, convenience of other users may be damaged. However, since it is not possible to accurately ascertain the user of the vehicle under the circumstances, it is difficult to automatically switch whether to validate or restrict a specific function according to the user of the vehicle.

Accordingly, the disclosure provides a vehicle function control device and a vehicle function control system capable of improving convenience of a vehicle by automatically switching between validation and restriction of a specific function.

A first aspect of the disclosure relates to a vehicle function control device that controls functions of a vehicle. The vehicle function control device includes an electronic control unit. The electronic control unit is configured to determine whether or not there is a terminal device performing communication with an in-vehicle communication device around the in-vehicle communication device using the in-vehicle communication device, in a case where determination is made that there is the terminal device performing communication with the in-vehicle communication device around the in-vehicle communication device, determine whether or not a distance between the in-vehicle communication device and the terminal device is within a predetermined range, and control execution of a specific function of the vehicle based on a determination result about whether or not the distance between the in-vehicle communication device and the terminal device is within the predetermined range.

According to the first aspect of the disclosure, since it is possible to automatically control the execution of the specific function of the vehicle based on the determination result about whether or not the distance between the in-vehicle communication device and the terminal device is within the predetermined range, it is possible to improve user's convenience.

In the vehicle function control device according to the first aspect of the disclosure, the electronic control unit may be configured to, in a case where determination is made that the distance between the in-vehicle communication device and the terminal device is within the predetermined range, restrict the execution of the specific function of the vehicle.

According to the first aspect of the disclosure, since it is possible to automatically restrict the execution of the specific function of the vehicle in a case where the distance between the in-vehicle communication device and the terminal device is within the predetermined range, it is possible to improve user's convenience.

In the vehicle function control device according to the first aspect of the disclosure, the electronic control unit may be configured to, in a case where determination is made that the distance between the in-vehicle communication device and the terminal device is within the predetermined range, validate the execution of the specific function of the vehicle.

According to the first aspect of the disclosure, since it is possible to automatically validate the execution of the specific function of the vehicle in a case where the distance between the in-vehicle communication device and the terminal device is within the predetermined range, it is possible to improve user's convenience.

In the vehicle function control device according to the first aspect of the disclosure, the specific function may be an authentication function of performing communication between an in-vehicle device and a portable device using an electric wave in a frequency band different from the in-vehicle communication device to perform authentication of the portable device. The electronic control unit may be configured to, in a case where determination is made that there is no terminal device performing communication with the in-vehicle communication device around the in-vehicle communication device or in a case where determination is made that the distance between the in-vehicle communication device and the terminal device is not within the predetermined range, perform control to make the in-vehicle device validate the authentication function.

According to the first aspect of the disclosure, solely in a case where there is no terminal device that performs communication with the in-vehicle communication device around the in-vehicle communication device or in a case where the distance between the in-vehicle communication device and the terminal device is not within the predetermined range, it is possible to validate the authentication function of the portable device through wireless communication; thus, when a terminal device that performs communication with the in-vehicle communication device is not carried, it is possible to use the authentication function of the portable device through wireless communication without damaging convenience.

In the vehicle function control device according to the first aspect of the disclosure, the in-vehicle communication device may be a communication device that performs ultra-wideband communication. The electronic control unit may be configured to determine whether or not there is a terminal device performing ultra-wideband communication around the in-vehicle communication device using the in-vehicle communication device.

In the vehicle function control device according to the first aspect of the disclosure, the specific function may be a function of authenticating the terminal device through inter-communication between the terminal device and the in-vehicle communication device.

In the vehicle function control device according to the first aspect of the disclosure, the specific function may be execution of a predetermined function through an operation of a traveling system switch.

In the vehicle function control device according to the first aspect of the disclosure, the specific function may be opening and closing of a window through an operation of an operation switch of a power window.

In the vehicle function control device according to the first aspect of the disclosure, the specific function may be a child safety lock function.

A second aspect of the disclosure relates to a vehicle function control system includes a terminal device, an in-vehicle communication device, and a vehicle function control device. The vehicle function control device includes an electronic control unit. The electronic control unit is configured to determine whether or not there is a terminal device performing communication with the in-vehicle communication device around the in-vehicle communication device using the in-vehicle communication device, in a case where determination is made that there is the terminal device performing communication with the in-vehicle communication device around the in-vehicle communication device, determine whether or not a distance between the in-vehicle communication device and the terminal device is within a predetermined range, and control execution of a specific function of the vehicle based on a determination result about whether or not the distance between the in-vehicle communication device and the terminal device is within the predetermined range.

In the vehicle function control system according to the second aspect of the disclosure, the in-vehicle communication device may be a communication device that performs ultra-wideband communication. The electronic control unit may be configured to determine whether or not there is a terminal device performing ultra-wideband communication around the in-vehicle communication device using the in-vehicle communication device.

In the vehicle function control system according to the second aspect of the disclosure, the in-vehicle communication device may be configured to measure the distance between the in-vehicle communication device and the terminal device using a ranging function of ultra-wideband communication.

According to the aspects of the disclosure, it is possible to provide a vehicle function control device and a vehicle function control system capable of improving convenience of a vehicle by automatically switching whether to validate or restrict a specific function.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Outline

In the disclosure, control whether to invalidate or validate a specific function of a vehicle according to the distance between a communication terminal device that is carried with a target person who desires to restrict (or validate) the specific function and an in-vehicle communication device mounted in the vehicle is performed.

First Embodiment

Configuration

Figure 1:
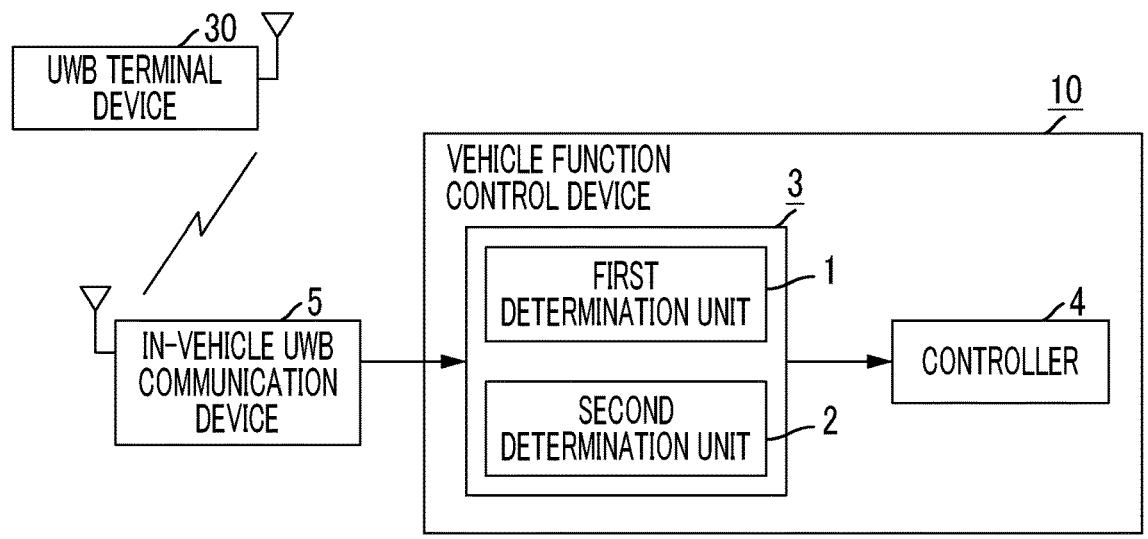
FIG. 1 is a functional block diagram of a vehicle function control device according to a first embodiment.

FIG. 1 is a functional block diagram of a vehicle function control device according to an embodiment.

A vehicle function control device 10 according to a first embodiment includes a distance determination unit 3 and a controller 4.

The distance determination unit 3 determines whether or not the distance between an in-vehicle UWB communication device 5 that performs ultra-wideband wireless (hereinafter, referred to as "UWB") communication and another UWB terminal device 30 around the in-vehicle UWB communication device 5 satisfies a predetermined condition using the in-vehicle UWB communication device 5. The distance determination unit 3 has, for example, a first determination unit 1 and a second determination unit 2. The UWB terminal device 30 is, for example, a tag incorporated with a UWB communication module or a smartphone having a UWB communication function. The UWB terminal device 30 may have a UWB communication module incorporated in an electronic key. Here, while the distance between the in-vehicle UWB communication device 5 and another UWB terminal device 30 around the in-vehicle UWB communication device 5 using a ranging function of UWB communication is acquired, communication systems other than UWB communication may be used.

The first determination unit 1 determines whether or not there is the UWB terminal device 30 around the in-vehicle UWB communication device 5 based on whether or not a UWB signal pulse is received. The second determination unit 2 acquires the distance between the in-vehicle UWB communication device 5 and the UWB terminal device 30 from the in-vehicle UWB communication device 5 in a case where the first determination unit 1 determines that there is the UWB terminal device 30 around the in-vehicle UWB communication device 5, and determines whether or not the acquired distance is within a predetermined range.

The controller 4 restricts execution of a specific function of a vehicle in a case where the second determination unit 2 determines that the distance between the in-vehicle UWB communication device 5 and the UWB terminal device 30 is within the predetermined range. Here, the restriction includes not only invalidating all specific functions, but also invalidating solely a part of the specific functions. Examples of the specific functions to be a control target include a smart authentication function of authenticating a portable device through intercommunication between the portable device (electronic key) and an in-vehicle device, execution of each function through an operation of a traveling system switch (an engine switch, a switch for setting an inter-vehicle distance from a preceding vehicle, or the like), and opening and closing of a window through an operation of an operation switch of a power window.

Control Processing

Figure 2:
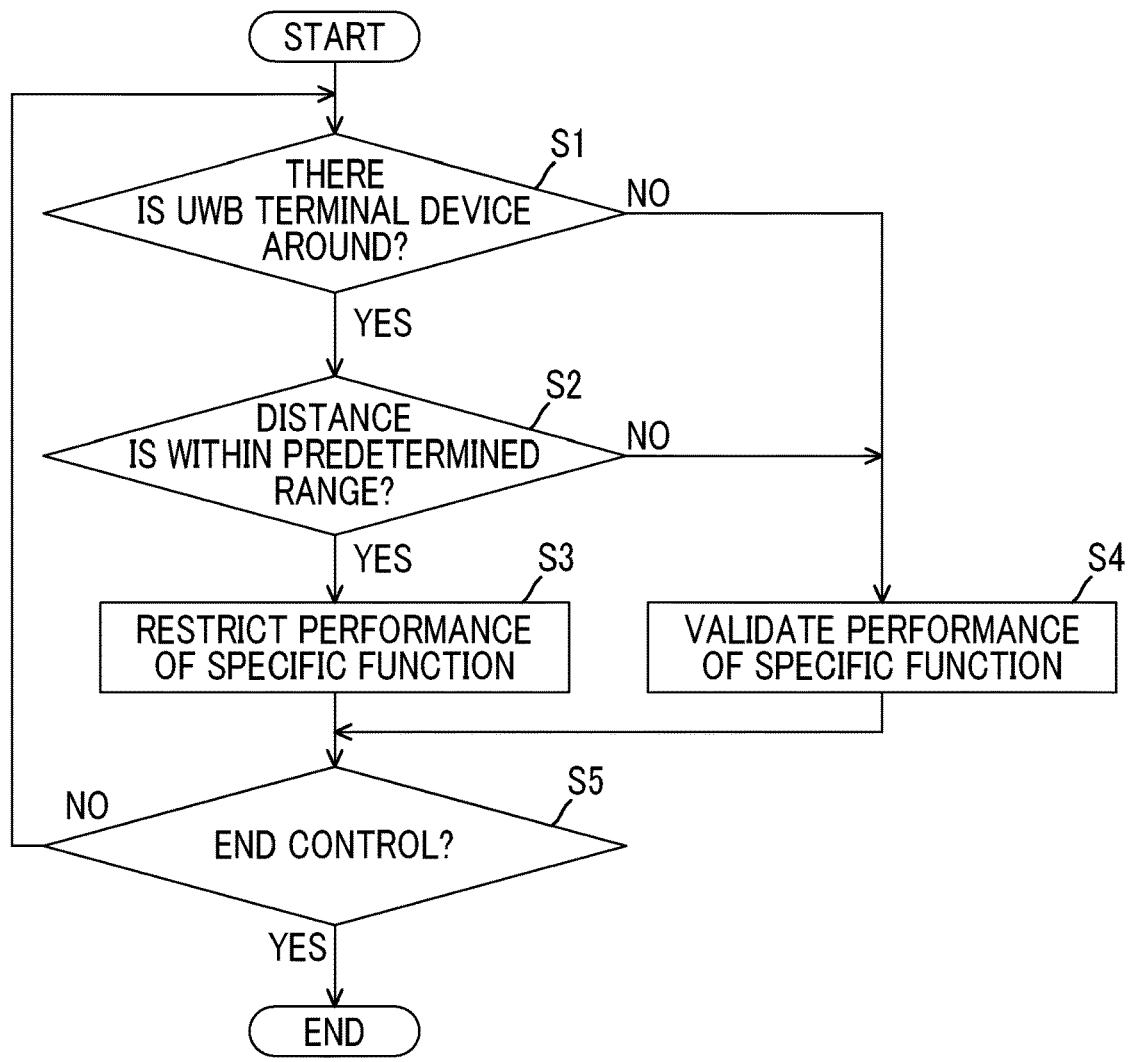
FIG. 2 is a flowchart showing control processing of the vehicle function control device shown in FIG. 1.

FIG. 2 is a flowchart showing control processing of the vehicle function control device shown in FIG. 1. Hereinafter, the control processing that the vehicle function control device 10 according to the first embodiment performs will be described referring to FIGS. 1 and 2.

First, in Step S1, the first determination unit 1 determines whether or not there is the UWB terminal device 30 around the in-vehicle UWB communication device 5. In a case where the first determination unit 1 determines that there is the UWB terminal device 30 around the in-vehicle UWB communication device 5 (in Step S1, YES), the process progresses to Step S2, and otherwise (in Step S1, NO), the process progresses to Step S4.

In Step S2, the second determination unit 2 determines whether or not the distance between the in-vehicle UWB communication device 5 and the UWB terminal device 30 acquired from the in-vehicle UWB communication device 5 is within the predetermined range. In a case where determination is made that the distance between the in-vehicle UWB communication device 5 and the UWB terminal device 30 is within the predetermined range (in Step S2, YES), the process progresses to Step S3, and otherwise (in Step S2, NO), the process progresses to Step S4.

In Step S3, the controller 4 restricts the execution of the specific function to be a control target. Thereafter, the process progresses to Step S5.

In Step S4, the controller 4 validates the execution of the specific function to be a control target. Thereafter, the process progresses to Step S5. The processing of Step S4 is performed in a case where there is no UWB terminal device 30 around the in-vehicle UWB communication device 5 or in a case where the distance between the in-vehicle UWB communication device 5 and the UWB terminal device 30 is not within the predetermined range.

In Step S5, the controller 4 determines whether or not to end the function control processing of Steps S1 to S4. Since the processing of Steps S1 to S4 is processing for automatically controlling whether to restrict or validate the execution of the specific function and improving user's convenience, it is desirable that the processing of Steps S1 to S4 is performed repeatedly in a predetermined cycle. However, in a case where an end condition that the function control processing using UWB communication is off from a customized menu is established (in Step S5, YES), the process ends. Otherwise, the process returns to Step S1 and the above-described processing is performed. In a case where the on and off of the function control processing using UWB communication is not provided in the customized menu, Step S5 is not provided, and the process returns to Step S1 after Step S3 or S4 is performed.

The vehicle function control device 10 shown in FIG. 1 can perform the function control processing by making an electronic control unit (ECU) (computer) configured to perform the specific function to be a control target perform the processing of each step shown in FIG. 2. In more detail, the function control processing shown in FIG. 2 can be performed by storing a program of the function control processing shown in FIG. 2 in a storage device, such as a memory, in advance, and making a processor of the ECU read the program from the storage device and perform the program.

Specific Example

Figure 3:
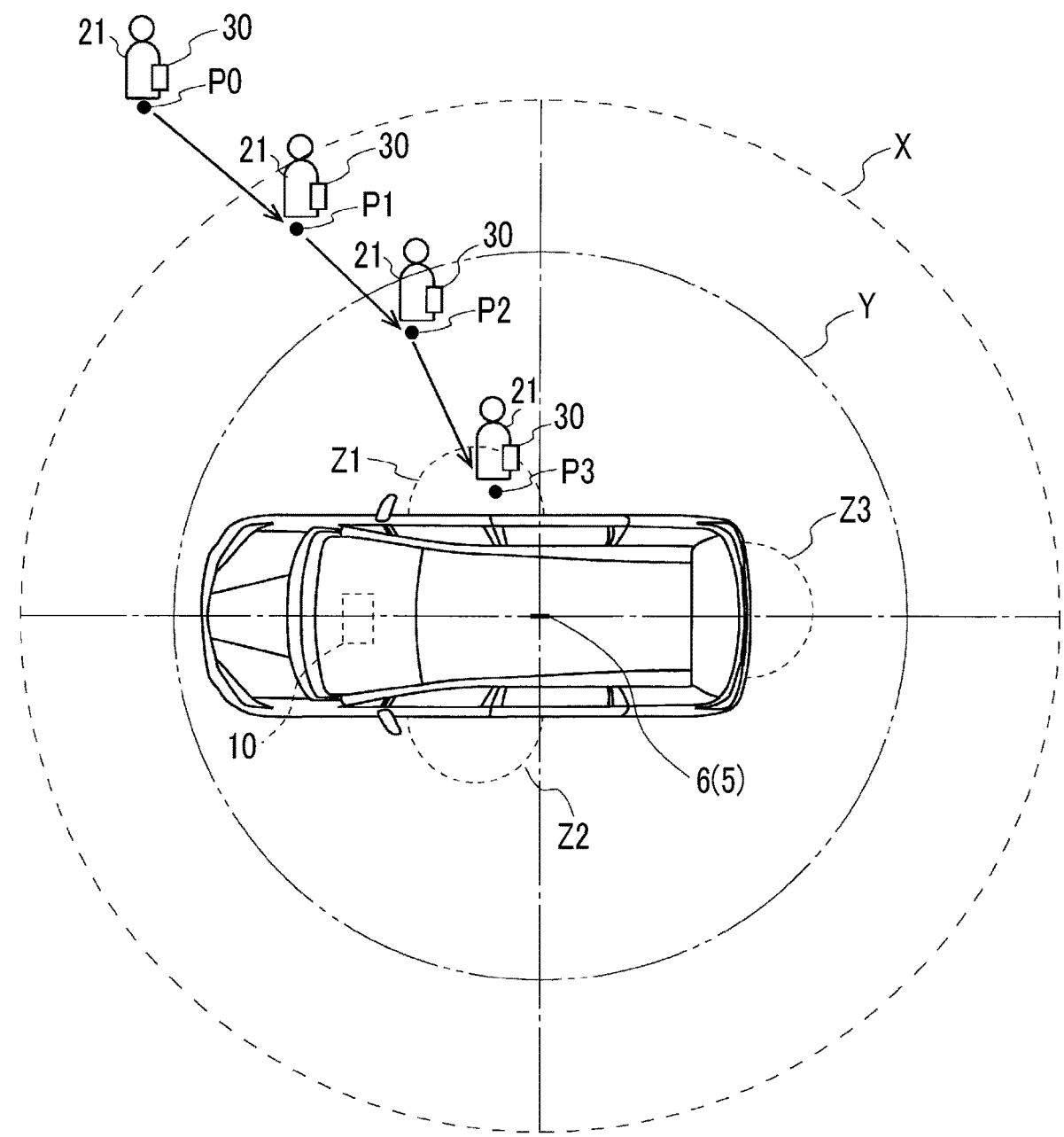
FIG. 3 is a diagram showing a specific example of function control that the vehicle function control device shown in FIG. 1 performs.

FIG. 3 is a diagram showing a specific example of the function control processing that the vehicle function control device shown in FIG. 1 performs. In FIG. 3, an example where execution of a smart authentication function of authenticating a portable device through communication between the portable device, such as an electronic key carried with a user of a vehicle, and an in-vehicle device (both are not shown) is restricted will be described. For simplification of description, while an antenna 6 of the in-vehicle UWB communication device 5 is provided at the center of a roof of the vehicle (outside the vehicle), the position of the antenna 6 can be changed optionally. The function control processing described referring to FIG. 3 is performed by an authentication ECU that controls the smart authentication function.

In FIG. 3, a circle indicated by a long broken line schematically shows a region X where the in-vehicle UWB communication device 5 can perform communication. A range where the in-vehicle UWB communication device 5 can perform communication is within about 10 m radius from the antenna 6. A circle indicated by a two-dot-chain line shows a region Y where the smart authentication function is invalidated when there is a user 21 who carries the UWB terminal device 30. It is assumed that a range where the smart authentication function is invalidated when there is the UWB terminal device 30 is within, for example, 7 m radius from the antenna 6. An arc indicated by a short broken line schematically shows regions Z1 to Z3 where an electric wave in an LF band of the in-vehicle device that performs smart authentication reaches. In general, an out-vehicle antenna (not shown) of the in-vehicle device is provided in a driver's seat door handle, a passenger's seat door handle, or outside a luggage room, and the range where the electric wave in the LF band reaches is within about 70 cm radius from the out-vehicle antenna.

The user 21 is, for example, a user of a cardiac pacemaker, and desires to invalidate the smart authentication function when the user 21 gets on the vehicle; thus, the user 21 carries the UWB terminal device 30 that can perform UWB communication.

First, in a case where the user 21 is at a position P0 outside the communication region X of the in-vehicle UWB communication device 5, the vehicle function control device 10 cannot detect the presence of the UWB terminal device 30. Accordingly, in a case where the user 21 is outside the region X, the vehicle function control device 10 does not restrict the smart authentication function, and an LF signal is output to the regions Z1 to Z3.

Next, in a case where the user 21 moves to a position P1 inside the region X and outside the region Y, the vehicle function control device 10 detects the presence of the UWB terminal device 30. However, since the distance to the UWB terminal device 30 measured by the in-vehicle UWB communication device 5 is not within a predetermined range (in this case, a range of 7 m radius), the vehicle function control device 10 does not restrict the smart authentication function, and the LF signal is output to the regions Z1 to Z3.

Next, in a case where the user 21 moves to a position P2 inside the region Y, the distance to the UWB terminal device 30 measured by the in-vehicle UWB communication device 5 is included in the predetermined range (the range of 7 m radius); thus, the vehicle function control device 10 invalidates the smart authentication function, and the output of the LF signal to the regions Z1 to Z3 is stopped.

Thereafter, even though the user 21 moves to a position P3 inside the region Z1 on the driver's seat side to get on the vehicle, a condition that the smart authentication function is invalidated is established continuously; thus, the output of the LF signal to the regions Z1 to Z3 is stopped.

Though not shown and not described, in a case where an antenna of the in-vehicle UWB communication device is provided inside the vehicle, while the UWB terminal device 30 is being detected inside the vehicle, it is possible to continuously restrict the smart authentication function. Even though the antenna of the in-vehicle UWB communication device is not provided inside the vehicle, in a case where decision is made that the UWB terminal device 30 enters inside the vehicle in a case where the UWB terminal device 30 is near a door, and then, the door is opened, it is possible to continuously restrict the smart authentication function. In a case where an antenna of a UWB communication device is provided at a position (for example, a roof inside the vehicle, or the like) where an extensive view of the inside and the outside of the vehicle is given, even in a case where on UWB antenna is used, it is possible to detect a position of the UWB terminal device 30 inside and outside the vehicle.

In the example shown in FIG. 3, vehicle function control device 10 can automatically switch whether to restrict or validate the smart authentication function based on whether or not the distance between the antenna 6 of the in-vehicle UWB communication device 5 and the UWB terminal device 30 is within the predetermined range (within the range of 7 m radius). Accordingly, the user 21 who desires to invalidate the smart authentication function can invalidate the smart authentication function without awareness in a case where the user 21 carries the UWB terminal device 30, and convenience for the user 21 is improved. In a case where the size of the region Y where the smart authentication function is invalidated is made large enough to include the regions Z1 to Z3, it is possible to invalidate the smart authentication function with sufficient time before the user 21 approaches the regions Z1 to Z3. In a case where the UWB terminal device 30 is not carried, the smart authentication function is not automatically invalidated; thus, convenience for a user who wants to use the smart authentication function is improved. In a case where setting about whether or not each UWB terminal device 30 is subjected to function restriction is made in advance, even though the user 21 carries the UWB terminal device 30, it is possible to adaptively set validation and invalidation of the smart authentication function.

Figure 4:
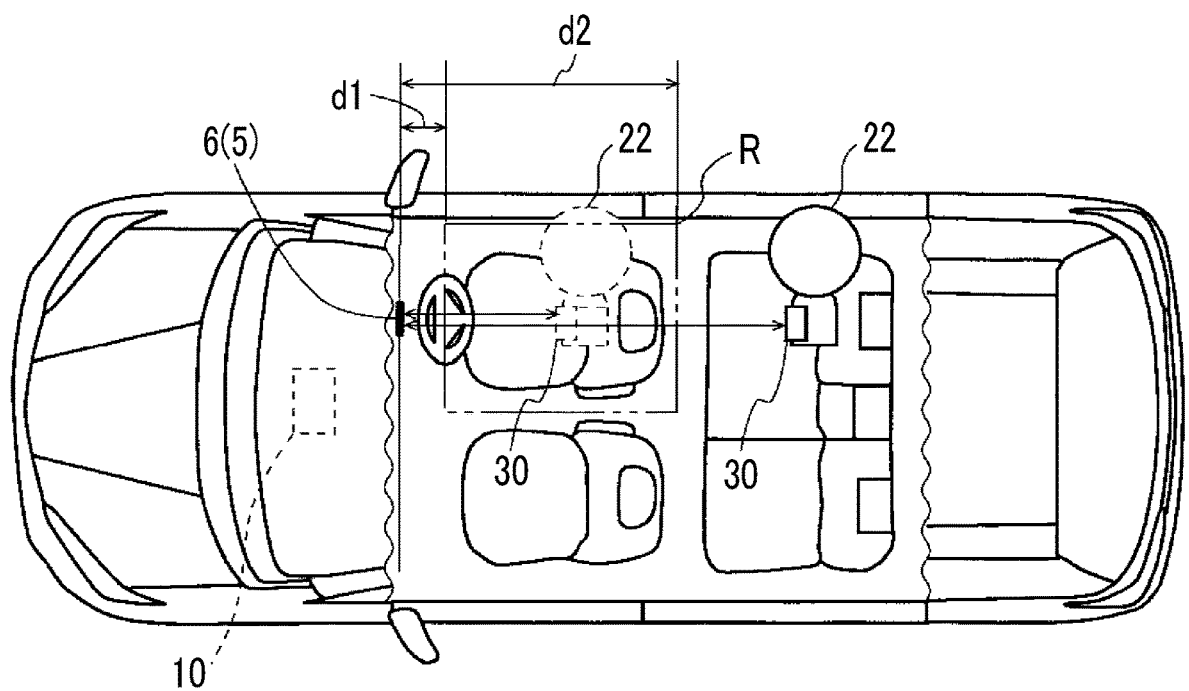
FIG. 4 is a diagram showing another specific example of function control that the vehicle function control device shown in FIG. 1 performs.

FIG. 4 is a diagram showing another specific example of the function control processing that the vehicle function control device shown in FIG. 1 performs, and is a diagram showing a state in which a roof portion and the vicinity thereof are cut from a plan view of a vehicle. In FIG. 4, an example where a function through an operation of a traveling system switch (an engine switch, a switch for setting an inter-vehicle distance from a preceding vehicle, or the like) in a driver's seat door is restricted will be described. In the example of FIG. 4, while the antenna 6 of the in-vehicle UWB communication device 5 is provided on a dashboard in front of a steering wheel, the position of the antenna 6 can be changed optionally. The function control processing described referring to FIG. 4 can be realized by an ECU that controls traveling of the vehicle.

In FIG. 4, a quadrangular region R indicated by a two-dot-chain line is a range where a traveling system switch is to be restricted when a child 22 who carries the UWB terminal device 30 enters. In simply detecting whether or not the UWB terminal device 30 is within the region R according to the distance between the antenna 6 and the UWB terminal device 30, determination may be made whether or not the distance between the antenna 6 and the UWB terminal device 30 in a front-rear direction of the vehicle is within a range equal to or greater than d1 and equal to or less than d2.

First, in a case where the child 22 sits on a backseat (a position indicated by a solid line), the vehicle function control device 10 detects the presence of the UWB terminal device 30; however, since the distance between the antenna 6 and the UWB terminal device 30 that is carried with the child 22 is greater than d2, the function through the operation of the traveling system switch is not restricted.

Next, in a case where the child 22 moves to a driver's seat (a position indicated by a broken line), since the distance between the antenna 6 and the UWB terminal device 30 is within a range equal to or greater than d1 and equal to or less than d2, the operation of the traveling system switch is invalidated, and execution of a predetermined function through the operation of the traveling system switch is suppressed.

In the example shown in FIG. 4, determination is made whether or not the distance between the antenna 6 of the in-vehicle UWB communication device 5 and the UWB terminal device 30 is within the predetermined range (within the range equal to or greater than d1 and equal to or less than d2), whereby it is possible to simply determine whether or not the child 22 is within the restriction region R of the driver's seat, and to automatically switch whether to restrict or validate a function through the operation of the traveling system switch. Accordingly, even in a case where the child 22 enters the driver's seat and operates the traveling system switch unexpectedly, it is possible to invalidate the operation of the traveling system switch. In a case where the UWB terminal device 30 is not carried, the operation of the traveling system switch is not automatically invalidated; thus, in w case where a driver sits on the driver's seat, the operation of the traveling system switch is not restricted, and convenience for the driver is improved.

In the example of FIG. 4, although an example where the operation of the traveling system switch is restricted has been described, switches other than the traveling system switch may be restricted. In the example of FIG. 4, although an example where the child 22 carries the UWB terminal device 30 has been described, the UWB terminal device 30 may be carried with a pet, and an unexpected operation of the pet entering the restriction region R of the driver's seat may be restricted.

Effects and the Like

As described above, the vehicle function control device 10 according to the first embodiment restricts the execution of the specific function in a case where the distance between the in-vehicle UWB communication device 5 and the UWB terminal device 30 is within the predetermined range. Accordingly, since it is possible to automatically switch whether to restrict or validate the execution of the specific function according to whether or not the UWB terminal device 30 is carried, it is possible to improve convenience.

In the related art, while the user can be specified through the detection of the electronic key or paring of the smartphone and the in-vehicle device using Bluetooth (Registered Trademark), it is difficult to specify the position of the user. Since UWB communication used in the first embodiment has high ranging accuracy, it is possible to accurately measure the distance of the user who carries the UWB terminal device 30, and to perform the execution control of the specific function with high accuracy.

Second Embodiment

Configuration and Control Processing

Figure 5:
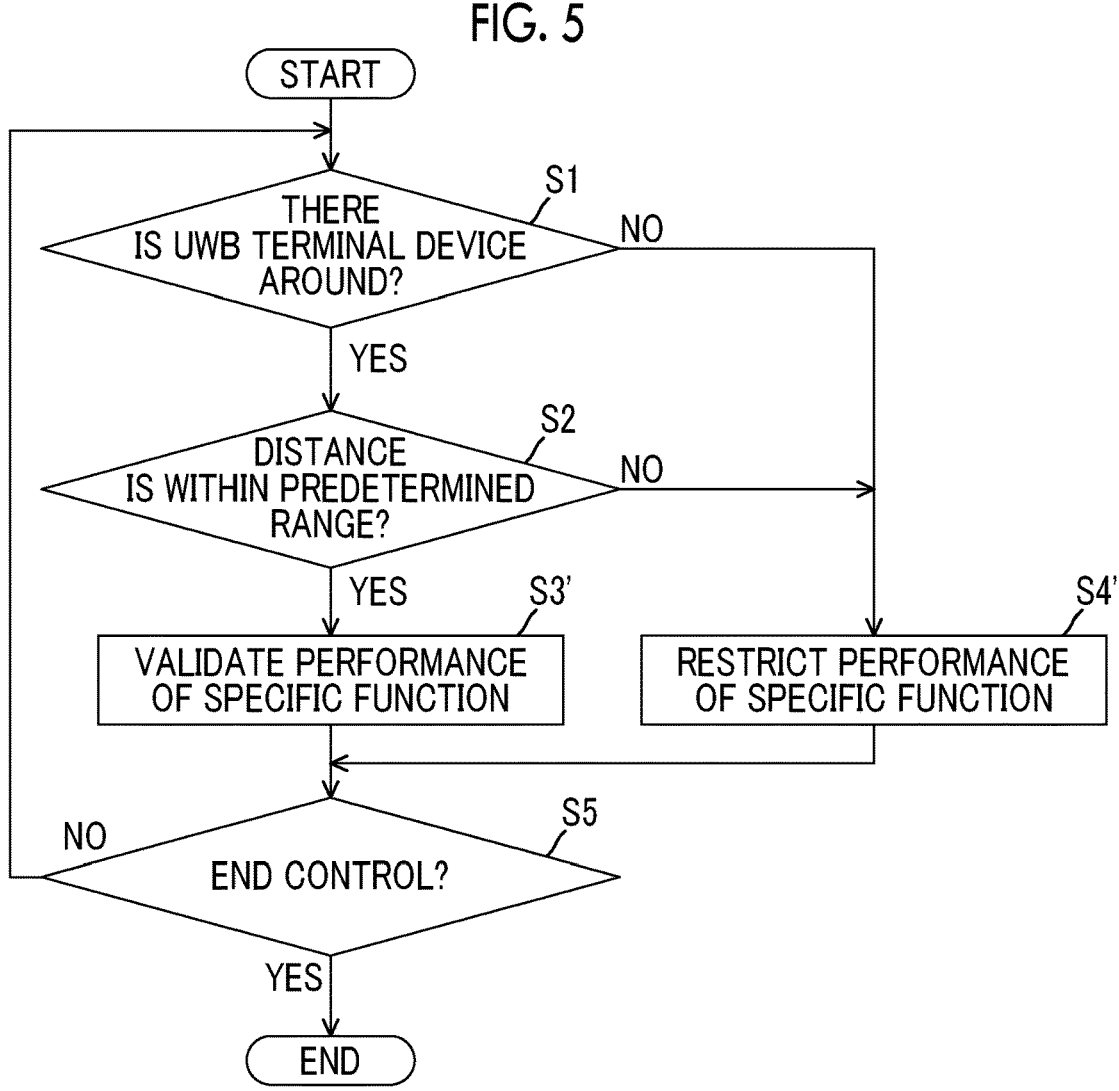
FIG. 5 is a flowchart showing control processing of a vehicle function control device according to a second embodiment.

FIG. 5 is a flowchart showing control processing of a vehicle function control device according to a second embodiment. Hereinafter, description will be provided focusing on the difference between the second embodiment and the first embodiment.

While the basic configuration of the vehicle function control device according to the second embodiment is the same as in the first embodiment shown in FIG. 1, the processing that the controller performs is different from that in the first embodiment. In the control processing that the vehicle function control device according to the second embodiment performs, Steps S3 and S4 of FIG. 2 are substituted with Steps S3' and S4' shown in FIG. 5, respectively.

The controller in the first embodiment restricts the execution of the specific function in a case where the distance between the in-vehicle UWB communication device and the UWB terminal device is within the predetermined range, and validates the execution of the specific function otherwise. In contrast, a controller in the second embodiment validates the execution of the specific function in a case where the distance between the in-vehicle UWB communication device and the UWB terminal device is within the predetermined range (Step S3'), and restricts the execution of the specific function otherwise (Step S4').

Specific Example

Hereinafter, a specific example of the second embodiment will be described in connection with an automatic child safety lock function of automatically switching on and off of a child safety lock of a backseat door according to a position where a child sits. That is, in the second embodiment, a specific function to be a control target is an automatic child safety lock function. Processing of FIGS. 6 and 7 described below can be realized by an ECU that controls a door lock of a vehicle.

Figure 6:
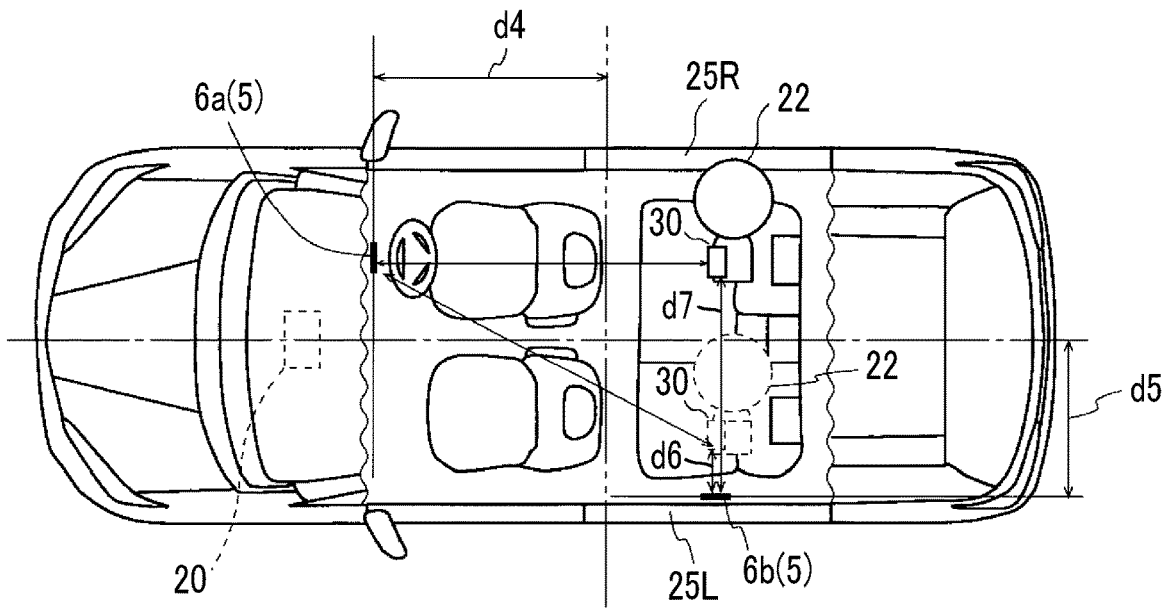
FIG. 6 is a diagram showing a specific example of control that the vehicle function control device according to the second embodiment performs.

FIG. 6 is a diagram showing a specific example of control that the vehicle function control device according to the second embodiment performs, and is a diagram showing a state in which a roof portion and the vicinity thereof are cut from a plan view of a vehicle. As a premise, in the second embodiment, it is assumed that the on and off of the child safety lock function of the backseat is not switched through an operation of a lever provided in a door as in the related art, and can be switched by an electrical mechanism independently on the right and left sides. In the example of FIG. 6, while an antenna 6a on a dashboard in front of a steering wheel and an antenna 6b near a left door 25L of a backseat are provided as the antenna of the in-vehicle UWB communication device 5, the positions of the antennas 6a, 6b can be changed.

In FIG. 6, a vertical line indicated by a two-dot-chain line is a boundary line between driver's and passenger's seats and a backseat. In simply detecting whether or not there is the UWB terminal device 30 on the backseat according to the distance between the antenna 6a and the UWB terminal device 30, determination may be made whether or not the distance between the antenna 6a and the UWB terminal device 30 is within a range equal to or greater than d4.

In FIG. 6, a horizontal line indicated by a one-dot-chain line is a center line of the right and left sides of the vehicle. In simply detecting whether or not there is the UWB terminal device 30 on one of the right and left seats according to the distance between the antenna 6a and the UWB terminal device 30, determination may be made whether or not the distance between the antenna 6b and the UWB terminal device 30 is within a range equal to or less than d5 or within a range greater than d5.

First, determination is made whether or not the child 22 sits on the backseat, and determination is made whether to validate or restrict the automatic child safety lock function. In a case where the child 22 sits on the backseat, in both cases where the sitting position is the right side (a position of a circle indicated by a solid line) and the left side (a position of a circle indicated by a broken line) of the backseat, the distance between the antenna 6a and the UWB terminal device 30 becomes equal to or greater than d4. In this case, the automatic child safety lock function is validated (corresponding to Step S3' of FIG. 5). In a case where it is not possible to detect that there is the UWB terminal device 30 inside the vehicle, or in a case where the distance between the antenna 6a and the UWB terminal device 30 is less than d4, the child 22 does not sit on the backseat; thus, the automatic child safety lock function is restricted (corresponding to Step S4' of FIG. 5).

Automatic Child Safety Lock Function

In a case where the automatic child safety lock function is validated, determination is made on which of the right and left sides of the backseat the child 22 sits, the child safety lock of the door of the seat on which the child 22 sits is turned on, and the child safety lock of the door of the seat on which the child 22 does not sit is turned off. Specifically, in a case where the distance between the antenna 6b and the UWB terminal device 30 carried with the child 22 is equal to or less than d5, determination can be made that the child 22 seats on the left side (the position of the circle indicated by the broken line) of the backseat; thus, a vehicle function control device 20 turns on the child safety lock of the left door 25L. On the contrary, in a case where the distance between the antenna 6b and the UWB terminal device 30 carried with the child 22 exceeds d5, determination can be made that the child 22 sits on the right side (the position of the circle indicated by the solid line) of the backseat; thus, the vehicle function control device 20 turns on a child safety lock of a right door 25R. In a case where detection is made that there is a plurality of UWB terminal devices 30 on the backseat, determination is made whether the child 22 seats solely on the left side (the position of the circle indicated by the broken line) of the backseat, seats solely on the right side (the position of the circle indicated by the solid line), or seats on both right and left sides (the positions of the circles indicated by the broken line and the solid line) of the backseat based on the distance between the antenna 6b and each UWB terminal device 30. In a case where determination is made that a plurality of children 22 seats on both right and left sides (the positions of the circles indicated by the broken line and the solid line) of the backseat, the vehicle function control device 20 turns on the child safety locks of both of the right and left doors 25R and 25L.

In FIG. 6, while the position of the UWB terminal device 30 on the backseat is determined based on whether or not the distance between the antenna 6b and the UWB terminal device 30 is equal to or less than d5, in order to detect that there is the UWB terminal device 30 close to the door with higher accuracy, determination may be made whether the distance from the antenna 6b is equal to or less than d6 (d6<d5) or equal to or greater than d7 (d7>d5). In this case, it is possible to determine a case where a child seats at the center of the backseat, and adults seat on both sides of the child.

Figure 7:
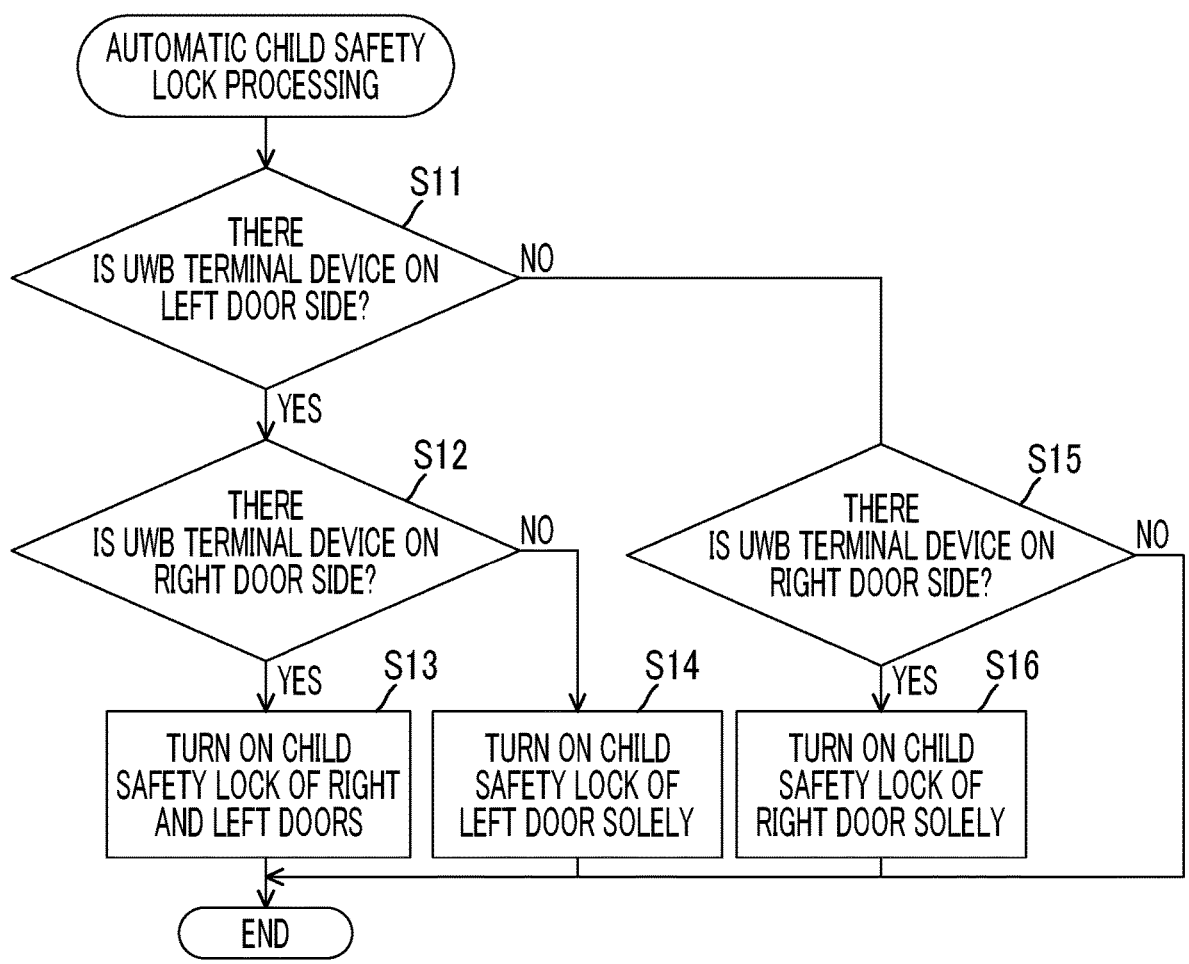
FIG. 7 is a flowchart of automatic child safety lock control processing that the vehicle function control device according to the second embodiment performs.

FIG. 7 is a flowchart showing control processing of an automatic child safety lock function that the vehicle function control device according to the second embodiment performs. The control processing shown in FIG. 7 is processing that a controller of the vehicle function control device performs based on a determination result of a distance determination unit (first determination unit and second determination unit).

First, in Step S11, the controller determines whether or not there is the UWB terminal device 30 on the seat of the left door 25L side based on the distance between the antenna 6b and the UWB terminal device 30. In a case where determination is made that there is the UWB terminal device 30 on the seat of the left door 25L side (in Step S11, YES), the process progresses to Step S12, and otherwise (in Step S11, NO), the process progresses to Step S15.

In Step S12, the controller determines whether or not there is the UWB terminal device 30 on the seat of the right door 25R side based on the distance between the antenna 6b and the UWB terminal device 30. In a case where determination is made that there is the UWB terminal device 30 on the seat of the right door 25R side (in Step S12, YES), the process progresses to Step S13, and otherwise (in Step S12, NO), the process progresses to Step S14.

In Step S13, the controller turns on the child safety locks of both of the right door 25R and the left door 25L, and ends the process.

In Step S14, the controller turns on the child safety lock of the left door 25L solely, and ends the process.

In Step S15, the controller determines whether or not there is the UWB terminal device 30 on the seat of the right door 25R based on the distance between the antenna 6b and the UWB terminal device 30. In a case where determination is made that there is the UWB terminal device 30 on the seat of the right door 25R side (in Step S15, YES), the process progresses to Step S16, and otherwise (in Step S15, NO), the process ends.

In Step S16, the controller turns on the child safety lock of the right door 25R solely, and ends the process.

In the second embodiment, although the on and off of the child safety lock has been described as an example, for example, the disclosure may be applied to window opening and closing with a power window switch.

Effects and the Like

As described above, the vehicle function control device 20 according to the second embodiment validates the execution of the specific function in a case where the distance between the in-vehicle UWB communication device 5 and the UWB terminal device 30 is within the predetermined range. Accordingly, it is possible to automatically switch whether to automatically perform or restrict the specific function according to whether or not the UWB terminal device 30 is carried; thus, it is possible to improve convenience. Since UWB communication has high ranging accuracy, it is possible to perform the execution control of the specific function with high accuracy.

As in the first embodiment, in the related art, it is difficult to specify the position of the user. Since UWB communication that is used in the second embodiment has high ranging accuracy, it is possible to accurately measure the distance of the user who carries the UWB terminal device 30, and to perform the execution control of the specific function with high accuracy.

In a case where three or more antennas are used, and the distance between each antenna and the UWB terminal device 30 is measured, it is possible to specify the position of the UWB terminal device 30 with higher accuracy.

Other Modification Examples

In each embodiment, in a case where a smartphone that can perform UWB communication is used as the UWB terminal device 30, there may be a plurality of smartphones that can perform UWB communication around the vehicle or inside the vehicle; thus, in this case, a target person may be specified further based on identification information of a smartphone.

The vehicle function control device 20 according to the second embodiment can perform the specific function based on the presence and the distance of the UWB terminal device 30; thus, the vehicle function control device 20 can automatically perform various functions other than the automatic child safety lock function. For example, when the user who carries the UWB terminal device 30 uses the vehicle, it may be possible to automatically switch a temperature setting of an air conditioner to a temperature setting registered in advance, to automatically switch a sound setting, or to automatically switch music to be played.

The disclosure can be used as a control device of various functions in a vehicle.

What is claimed is:

1. A vehicle function control device that controls functions of a vehicle, the vehicle function control device comprising:
an electronic control unit configured to:
determine whether a terminal device is performing ultra-wideband (UWB) communication with an in-vehicle communication device in an area around the in-vehicle communication device, based on whether the in-vehicle communication device, which is installed in the vehicle, received a UWB signal;
when a determination is made that the terminal device is performing the UWB communication with the in-vehicle communication device in the area around the in-vehicle communication device, determine whether a distance between the in-vehicle communication device and the terminal device is within a predetermined range;
control execution of a specific function of a plurality of specific functions of the vehicle based on a determination result about whether the distance between the in-vehicle communication device and the terminal device is within the predetermined range; and
when a determination is made that the terminal device is not performing communication with the in-vehicle communication device in the area around the in-vehicle communication device, or when a determination is made that the distance between the in-vehicle communication device and the terminal device is not within the predetermined range, perform control to make the in-vehicle device validate the specific function,
wherein the plurality of specific functions includes a function related to a portable device using an electric wave in a frequency band different from the in-vehicle communication device, the portable device being an electronic key of the vehicle, the electronic key being different from the terminal device.

2. The vehicle function control device according to claim 1, wherein the electronic control unit is configured to, when a determination is made that the distance between the in-vehicle communication device and the terminal device is within the predetermined range, restrict the execution of the specific function of the vehicle.

3. The vehicle function control device according to claim 2, wherein:
the specific function is an authentication function of performing communication between an in-vehicle device and the portable device using the electric wave in the frequency band different from the in-vehicle communication device to perform authentication of the portable device.

4. The vehicle function control device according to claim 1, wherein the electronic control unit is configured to, when a determination is made that the distance between the in-vehicle communication device and the terminal device is within the predetermined range, validate the execution of the specific function of the vehicle.

5. The vehicle function control device according to claim 1, wherein the plurality of specific functions includes a function of authenticating the terminal device through inter-communication between the terminal device and the in-vehicle communication device.

6. The vehicle function control device according to claim 1, wherein the plurality of specific functions includes execution of a predetermined function through an operation of a traveling system switch.

7. The vehicle function control device according to claim 1, wherein the plurality of specific functions includes opening and closing of a window through an operation of an operation switch of a power window.

8. The vehicle function control device according to claim 1, wherein the plurality of specific functions includes a child safety lock function.

9. A vehicle function control system comprising:
a terminal device;
an in-vehicle communication device; and
a vehicle function control device including an electronic control unit, the electronic control unit being configured to:
determine whether there the terminal device is performing ultra-wideband (UWB) communication with the in-vehicle communication device in an area around the in-vehicle communication device, based on whether the in-vehicle communication device, which is installed in the vehicle, received a UWB signal;
when a determination is made that the terminal device is performing the UWB communication with the in-vehicle communication device in the area around the in-vehicle communication device, determine whether a distance between the in-vehicle communication device and the terminal device is within a predetermined range;
control execution of a specific function of a plurality of specific functions of the vehicle based on a determination result about whether the distance between the in-vehicle communication device and the terminal device is within the predetermined range; and
when a determination is made that the terminal device is not performing communication with the in-vehicle communication device in the area around the in-vehicle communication device, or when a determination is made that the distance between the in-vehicle communication device and the terminal device is not within the predetermined range, perform control to make the in-vehicle device validate the specific function,
wherein the plurality of specific functions includes a function related to a portable device using an electric wave in a frequency band different from the in-vehicle communication device, the portable device being an electronic key of the vehicle, the electronic key being different from the terminal device.

10. The vehicle function control system according to claim 9, wherein the in-vehicle communication device is configured to measure the distance between the in-vehicle communication device and the terminal device using a ranging function of ultra-wideband communication.

11. A vehicle function control device that controls functions of a vehicle, the vehicle function control device comprising:
an electronic control unit configured to:
determine whether a terminal device is performing ultra-wideband (UWB) communication with an in-vehicle communication device in an area around the in-vehicle communication device, based on whether the in-vehicle communication device, which is installed in the vehicle, received a UWB signal;
when a determination is made that the terminal device is performing the UWB communication with the in-vehicle communication device in the area around the in-vehicle communication device, determine whether a distance between the in-vehicle communication device and the terminal device is within a predetermined range;

control execution of a specific function of a plurality of specific functions of the vehicle based on a determination result about whether the distance between the in-vehicle communication device and the terminal device is within the predetermined range;

when determination is made that the distance between the in-vehicle communication device and the terminal device is within the predetermined range, restrict the execution of the specific function of the vehicle, the specific function being an authentication function of performing communication between an in-vehicle device and an electronic key of the vehicle; and when a determination is made that the terminal device is not performing communication with the in-vehicle communication device around the in-vehicle communication device, or when a determination is made that the distance between the in-vehicle communication device and the terminal device is not within the predetermined range, perform control to make the in-vehicle device validate the authentication function, wherein the electronic key using an electric wave in a frequency band different from the in-vehicle communication device to perform authentication of the electronic key, and the electronic key being different from the terminal device.

\* \* \* \* \*